June 17, 1930.     B. SCHWEIN     1,765,244
SCREEN BRACKET FOR AUTOMOBILE WINDOWS AND THE LIKE
Filed Oct. 5, 1929     2 Sheets-Sheet 1
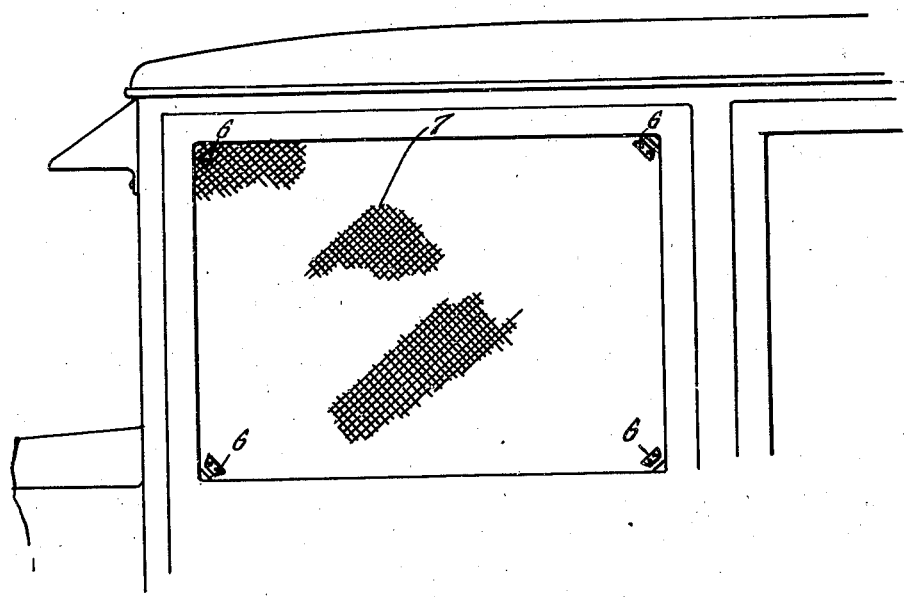
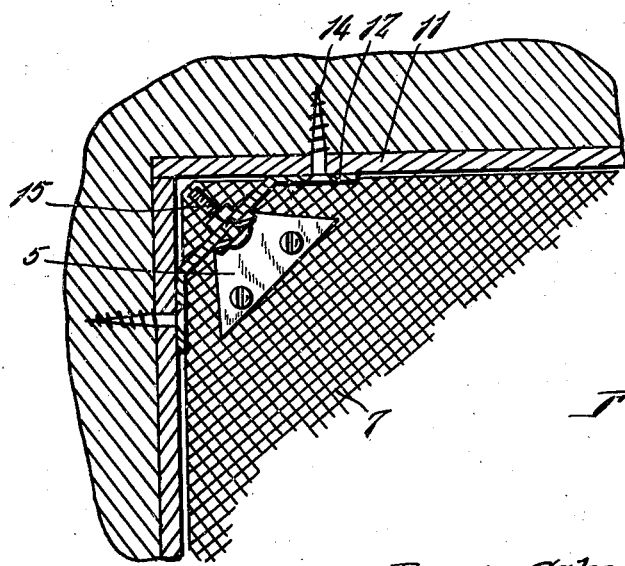
Inventor
Bruce Schwein
By Clarence A. O'Brien
Attorney June 17, 1930. B. SCHWEIN 1,765,244
SCREEN BRACKET FOR AUTOMOBILE WINDOWS AND THE LIKE
Filed Oct. 5, 1929 2 Sheets-Sheet 2
Fig. 2.
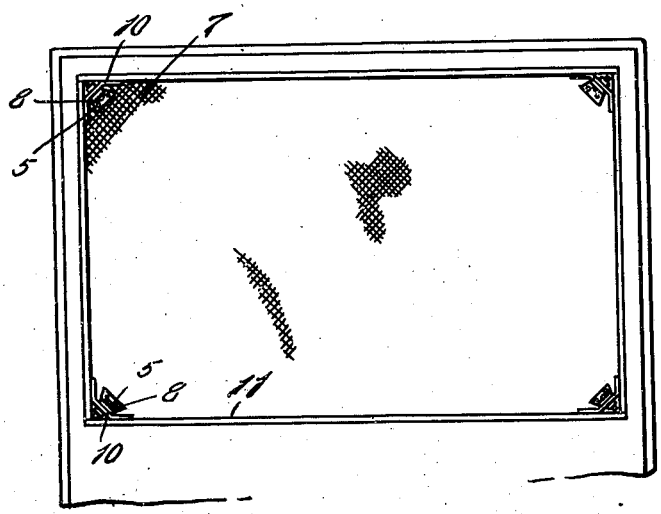
Fig. 4.
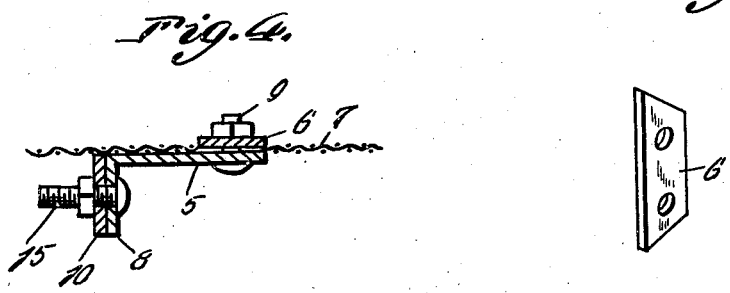
Fig. 5.
Fig. 6.
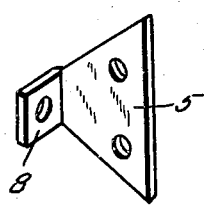
Inventor
Bruce Schwein
By Clarence A. O'Brien
Attorney Patented June 17, 1930

1,765,244

UNITED STATES PATENT OFFICE

BRUCE SCHWEIN, OF TURON, KANSAS

SCREEN BRACKET FOR AUTOMOBILE WINDOWS AND THE LIKE

Application filed October 5, 1929. Serial No. 397,653.

The present invention relates to brackets for securing screens in the openings of the doors and the like of automobiles and has for its prime object to provide a structure which is simple, inexpensive to manufacture, easy to install, thoroughly efficient and reliable in use, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is an outside elevation of a screen mounted in place by my improved bracket, Figure 2 is an inside elevation thereof, Figure 3 is an enlarged detail section through one corner and one of the brackets, Figure 4 is a sectional view taken substantially on the line 4—4 of Figure 3, Figure 5 is a perspective view of one of the clamp plates, and Figure 6 is a perspective view of the other clamp plate.

Referring to the drawing in detail it will be seen that each bracket utilizes a pair of clamp plates 5 and 6 adapted to be placed on opposite sides of a corner of the foraminous screen panel 7. The inside plate 5 is provided with a right angularly extending apertured ear 8. The plates 5 and 6 clamp together by means of suitable bolts 9.

A bracket plate 10 is disposed diagonally across the corner formed by a pair of window strips 11 being held in place by obtusely extending apertured ears 12 engaged in place by screws 15 which also assist in holding in place the strips 11. A bolt 15 extends through the apertured ear 8 and the center of the bracket plate 10 and by tightening the nut thereon the screen panel may be drawn tightly in place.

In installing a screen panel in accordance with this invention, the bracket plates 10 are first put in place and the clamp plates are then engaged on the screen panel and the ears 8 engage with the plates 10 and then the nuts are drawn up on the bolts 15 passing from one to the other gradually tightening them all up so as to evenly draw the screen panel tightly and firmly in place.

This screen panel should be inserted between the window strips 11 and the felt weather strip used in automobile windows and the like.

With this screen it will of course be possible to keep out of the car insects and the like also prevent objects from blowing out of the car. It will be seen that the bracket structure is exceedingly simple and is capable of being mounted in place in an easy and expeditious manner.

It is thought the construction, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts will be resorted to without departing from the spirit or scope of the invention as hereinafter claimed or sacrificing any of its advantages.

Having thus described my invention, what I claim as new is:

1. A device of the class described comprising a pair of plates, means for clamping the plates on opposite sides of a screen panel, an apertured ear extending from one of the plates, a bracket plate, means for attaching the bracket plate in the corner of a window diagonally thereof, and means for engaging the apertured ear in the center of the bracket plate.

2. A device of the class described comprising a pair of plates, means for clamping the plates on opposite sides of a screen panel, an apertured ear extending from one of the plates, a bracket plate, means for attaching the bracket plate in the corner of a window diagonally thereof, and means for engaging the apertured ear in the center of the bracket plate, said bracket plate having obtuse end-extensions for mounting the same in place.

In testimony whereof I affix my signature.

BRUCE SCHWEIN.